United States Patent [19]
Yamasaki et al.

[11] Patent Number: 5,910,298
[45] Date of Patent: Jun. 8, 1999

[54] METHOD OF AND APPARATUS FOR PERFORMING CONTINUOUS HYDROTHERMAL SYNTHESIS

[75] Inventors: Nakamichi Yamasaki, 107, Ko, Sakawa-cho, Kochi; Tsuneaki Mochida, Yokohama; Akihiro Maeda, Kawasaki; Takeshi Fukuda; Tsuyoshi Morimura, both of Kurobe, all of Japan

[73] Assignees: Nakamichi Yamasaki, Kochi; YKK Corporation, Tokyo, both of Japan

[21] Appl. No.: 08/779,351

[22] Filed: Jan. 6, 1997

[30] Foreign Application Priority Data

Jan. 10, 1996 [JP] Japan .................................... 8-002560
Nov. 22, 1996 [JP] Japan .................................... 8-312087

[51] Int. Cl.⁶ ...................................................... B29B 9/00
[52] U.S. Cl. .......................... 423/592; 423/607; 423/608; 423/610; 423/625; 264/12; 501/103; 501/127
[58] Field of Search .................. 264/12; 427/421, 427/427; 423/592, 591, 595, 598, 600, 606, 607, 608, 610, 624, 625; 501/103, 127

[56] References Cited

U.S. PATENT DOCUMENTS

| | | | |
|---|---|---|---|
| 3,701,828 | 10/1972 | Harker | 423/598 |
| 4,275,048 | 6/1981 | Stein et al. | 423/329 |
| 4,832,939 | 5/1989 | Menashi et al. | 501/138 |
| 5,061,682 | 10/1991 | Aksay et al. | 423/600 |
| 5,229,101 | 7/1993 | Watanabe et al. | 423/598 |
| 5,386,055 | 1/1995 | Lee et al. | 562/512.2 |
| 5,433,878 | 7/1995 | Arai et al. | 252/62.63 |
| 5,445,806 | 8/1995 | Kinugasa et al. | 423/598 |
| 5,453,262 | 9/1995 | Dawson et al. | 423/598 |
| 5,494,652 | 2/1996 | Robert | 423/592 |
| 5,558,783 | 9/1996 | McGuinness | 210/205 |
| 5,560,823 | 10/1996 | Whiting | 210/761 |
| 5,635,154 | 6/1997 | Arai et al. | 423/592 |
| 5,711,769 | 1/1998 | Inoue et al. | 423/308 |

FOREIGN PATENT DOCUMENTS

| | | |
|---|---|---|
| 53-57112 | 5/1978 | Japan . |
| 7128885 | 7/1982 | Japan . |
| 9019540 | 1/1984 | Japan . |
| 59-19540 | 2/1984 | Japan . |
| 2191257 | 7/1987 | Japan . |
| 2-5136 | 1/1990 | Japan . |
| WO 89/03365 | 4/1989 | WIPO . |
| WO 93/00304 | 1/1990 | WIPO . |
| WO 90/03331 | 4/1990 | WIPO . |

OTHER PUBLICATIONS

"Rapid and Continuous Hydrothermal Synthesis of Goehmite particles in subcritical and supercritical water" Adschiri et al. *J. Am. Cer. Soc.* (1992) 75(9) pp. 2615–2618.

*American Ceramic Society Bulletin* (Oct. 1988) "Hydrothermal Synthesis of Advanced Ceramic Powders" Dawson pp. 1673–1678 vol. 67 No. 10, 1988.

Tadafumi Adschirl, et al., "Rapid and Continuouis Hydrothermal Crystallization of Metal Oxide Particles in Supercritical Water," Journal of the American Ceramic Society, Apr. 1992, No. 4, pp. 1019–1022.

*Primary Examiner*—Paul Marcantoni
*Attorney, Agent, or Firm*—Finnegan, Henderson, Farabow, Garrett & Dunner, L.L.P.

[57] ABSTRACT

A continuous hydrothermal synthesis method which comprises pressurizing and heating a material slurry below a saturated vapor temperature or pressurizing a material slurry at normal temperature, pressurizing and heating an aqueous liquid above the saturated vapor temperature, atomizing and mixing the slurry and the aqueous liquid, effecting hydrothermal synthesis in a reaction section above the saturated vapor temperature, cooling the reaction product and taking out the product while retaining the pressurized state in the system by alternately opening and closing shut-off valves provided above and below a product discharging section or through a thin pipe provided in the product discharging section. The method is performed using an apparatus comprising heating-pressurizing sections respectively connected to a material slurry feeding section and an aqueous liquid feeding section, an atomizing-mixing section and a reaction section provided after these feeding sections, and a product discharging section.

18 Claims, 3 Drawing Sheets

METHOD OF AND APPARATUS FOR PERFORMING CONTINUOUS HYDROTHERMAL SYNTHESIS

BACKGROUND OF THE INVENTION

1. Field of the Invention

The present invention relates to a method of and an apparatus for continuously performing hydrothermal synthesis using a material slurry and an aqueous liquid.

2. Description of the Prior Art

The rate of reaction of numerous oxides, such as silica and alumina, with high-pressure water vapor, particularly water heated to a temperature not lower than a critical temperature, becomes higher in the presence of high temperature water, particularly high-pressure and high-temperature water. For this reason, hydrothermal synthesis using such a phenomenon is widely practiced.

Currently, the art of effecting hydrothermal synthesis of particles under pressurized conditions exceeding a critical pressure ($Tp=218.3$ atm) in a temperature region exceeding a saturated vapor temperature, particularly a temperature region exceeding a critical temperature ($Tc=374°$ C.), is carried out by a batch system. However, a large batch system requires long temperature rising and falling times in addition to the time required to retain a desired temperature and pressure after the setting of a material. In addition, because of batch production, the efficiency of synthesis in one apparatus is limited.

A method of continuously feeding and processing a slurry in a piping assembly is disclosed in, for example, Japanese Patent Laid-Open No. 53-57112, but this method is not directed to the hydrothermal synthesis of particles. Another method, which is disclosed in Japanese Patent Publication No. 2-5136 is carried out below a saturated aqueous vapor pressure. Yet another method, which is disclosed in PCT International Publication No. WO 93/00304 (Japanese National Publication No. 511190/1994), is intended to decompose organic substances, but is not intended to synthesize particles. In other words, there have not yet been continuous manufacturing techniques which are capable of performing hydrothermal synthesis of particles, reducing the temperature and pressure, and discharging the synthesized particles, by means of a piping which is assembled to retain a pressurized state at a temperature exceeding a critical temperature.

The present invention is intended to realize continuous hydrothermal synthesis in a pressurized state at a high temperature by solving problems, such as the problem of how to feed a material slurry, the problem of retaining the inside of a pipe in a high-temperature pressurized state, the problem of how to take out synthesized particles, and the problem of how to clean the inside of the apparatus after operation, these problems having been experienced in a case where a hydrothermal synthesis reaction is integrally carried out in a continuous piping by using as a synthesis region the cross-hatched region of the state-of-water diagram shown in FIG. 3.

SUMMARY OF THE INVENTION

The present invention provides a continuous hydrothermal synthesis method which comprises pressurizing and heating a material slurry containing an aqueous liquid to a temperature exceeding a saturated vapor temperature, and atomizing the material slurry containing the aqueous liquid in a reaction section to effect hydrothermal synthesis. More specifically, the present invention provides a continuous hydrothermal synthesis method which comprises pressurizing and heating a material slurry to a temperature lower than a saturated vapor temperature or pressurizing a material slurry at normal temperature, pressurizing and heating an aqueous liquid in excess of the saturated vapor temperature, atomizing and mixing both the material slurry and the aqueous liquid, and effecting hydrothermal synthesis in a reaction section in excess of the saturated vapor temperature. If a hydrothermal synthesis temperature region is not reached when the material slurry and the aqueous liquid are atomized and mixed, they are heated to a reaction temperature. Then, the reaction product is forcedly cooled before it is taken out of the system. The reaction product is taken out of the system in two ways. One way is to take out the product from the system while retaining the pressurized state in the system by alternately opening and closing shut-off valves provided above and below a product discharging section arranged on a piping. The other way is to take out the product after its pressure is reduced to a normal pressure by utilizing a pressure loss due to a fluid resistance of a fluid to an inner wall of a thin pipe connected to the product discharging section on the piping. The method of taking out the product through the shut-off valves or the method of taking out the product through the thin pipe is selected by a change-over cock.

Even if the material slurry is made to flow in a piping in a temperature range exceeding the saturated vapor temperature, particularly exceeding a critical temperature, since water is vaporized, solid components separate from the slurry and may clog the piping. For this reason, in the present invention, the material slurry and the aqueous liquid are separately prepared, and the material slurry is pressurized and heated to a temperature lower than the saturated vapor temperature or is pressurized at normal temperature, whereas the aqueous liquid is pressurized and heated in excess of the saturated vapor temperature. Then, the material slurry and the aqueous liquid are fed into the piping and are atomized and mixed immediately before a reaction stage, whereby the mixture is reacted in the form of a fluid heated in excess of the saturated vapor temperature, preferably in the form of a fluid heated to a temperature not lower than the critical temperature. The reason why the aqueous liquid is used in the present invention is that although the aqueous liquid may essentially be water, it may also take the form of an aqueous solution.

The product can be taken out of the system in two ways, as described above. In one way, the shut-off valves are provided both above and below the product discharging part, and when a reaction product reaches the product discharging part, the upstream shut-off valve is opened to feed the product into the product discharging part. Then, after the upstream shut-off valve is closed to shut off a high-pressure section, the downstream shut-off valve is opened to discharge the product. In the other way, the thin pipe is provided in the product discharging part, and the product is taken out after its pressure is reduced to a normal pressure by utilizing a pressure loss due to the fluid resistance of a fluid to the inner wall of the thin pipe. Accordingly, it is possible to take out the product without being affected by the high pressure in the piping.

The present invention also relates to an apparatus which can suitably carry out the aforesaid hydrothermal synthesis method. Specifically, in the same piping system, heating-pressurizing sections are respectively connected to a material slurry feeding section and an aqueous liquid feeding section, an atomizing-mixing section and a reaction section are provided after these feeding sections and a product discharging section having at its opposite ends shut-off valves which alternately operate is provided further after them. In the discharging section, a thin piping may be provided, in place of the shut-off valves or in addition to the shut-off valves. A heating section is provided between the atomizing-mixing section and the reaction section for the purpose of coping with the case in which a reaction temperature is not reached in the atomizing-mixing section. There is also an apparatus of the type in which a simple pressurizing section is, in place of the heating-pressurizing section, connected to the material slurry feeding section and a heating-pressurizing section is provided in the aqueous liquid feeding section, as set forth above. In addition, a forced cooling section is provided between the reaction section and the product discharging section.

A device for cleaning the apparatus is provided after a slurry pump and an aqueous liquid pump so that it can be changed over by cocks. The apparatus is cleaned by feeding air or water into the piping through either one of the cocks provided after the slurry pump and the aqueous liquid pump, with a pressure reducing section being opened and with the heating section and the reaction section being in a temperature range exceeding the saturated vapor temperature. The air or water to be fed can be adjusted from normal pressure to high pressure, and it is particularly desirable that the air or water be adjusted to high pressure in cleaning the atomizing-mixing section.

DETAILED DESCRIPTION OF THE PREFERRED EMBODIMENTS

The present invention can be applied to a hydrothermal synthesis reaction for synthesizing metallic oxides such as alumina ($Al_2O_3$), zirconia ($ZrO_2$), chromia ($Cr_2O_3$), hafnia ($HfO_2$) and titania ($TiO_2$). An embodiment will specifically be described below with reference to the accompanying drawings.

Figure 1:
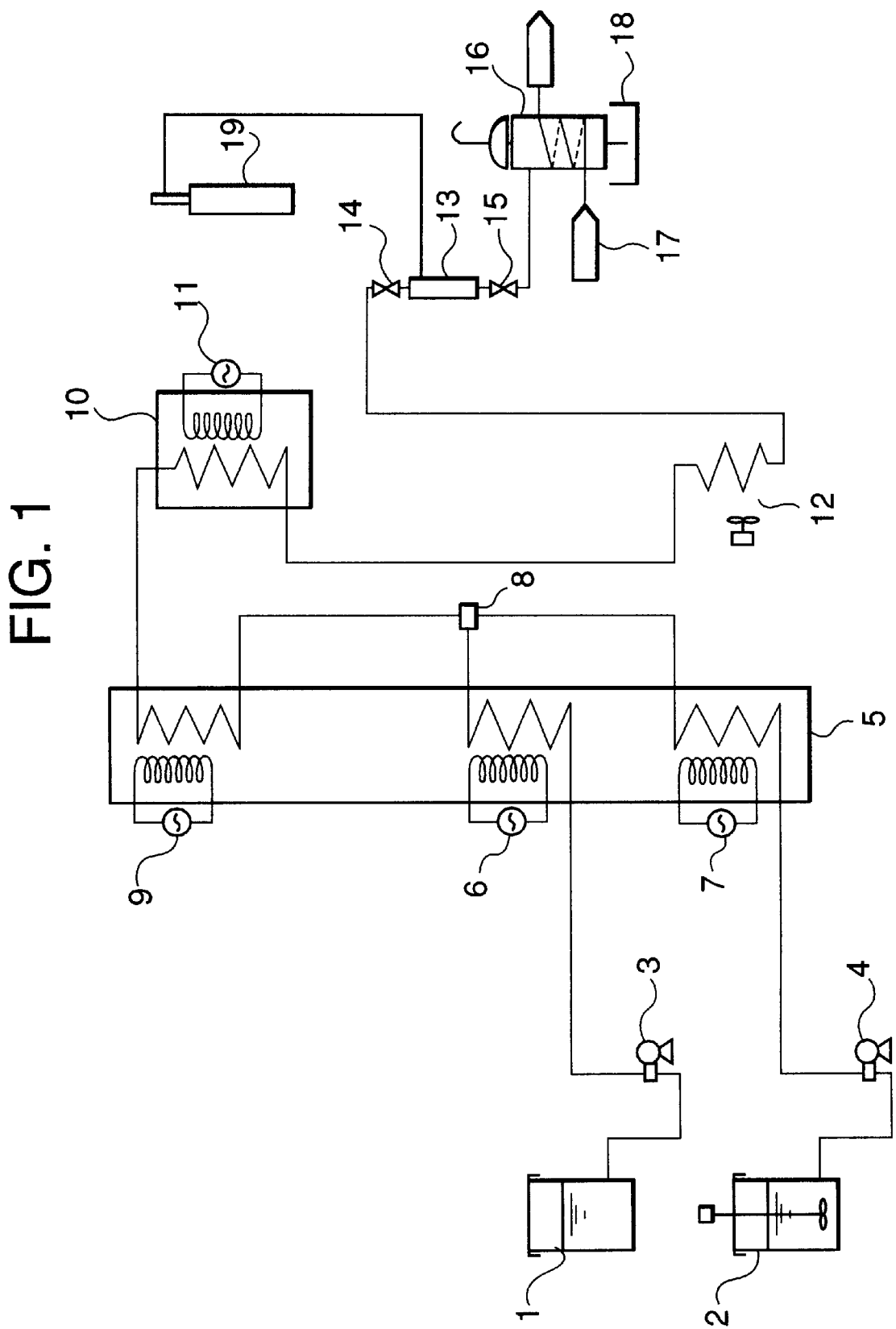
FIG. 1 shows one example of an apparatus for carrying out the present invention.

FIG. 1 shows one example of a continuous hydrothermal synthesis apparatus according to the present invention. Reference numeral 1 denotes an aqueous liquid tank, reference numeral 2 denotes a slurry tank, and reference numerals 3 and 4 denote a pump for feeding an aqueous liquid and a pump for feeding a slurry, respectively. Reference numeral 5 denotes a heating section, and reference numerals 6 and 7 denote heaters, respectively. The aqueous liquid (water) which has been fed from the aqueous liquid tank 1 by the pump 3 is heated to a temperature not lower than a saturated vapor temperature, particularly not lower than its critical temperature, by the heater 6. The slurry which has been fed from the slurry tank 2 by the pump 4 is heated to a temperature lower than the saturated vapor temperature by the heater 7. The aqueous liquid and the slurry which have been heated in this manner are mixed in a atomizing-mixing section 8, and the mixture is heated up to a temperature close to its reaction temperature by a heater 9 and is fed to a reaction section 10. The reaction section 10 is provided with a heater 11 so that it is maintained at a constant temperature.

The reaction product is forcedly cooled by a cooler 12 and is fed to a product discharging section 13. A shut-off valve 14 and a shut-off valve 15 are provided above and below the product discharging section 13, respectively. When the shut-off valve 14 is opened, the product is accommodated into the product discharging section 13. Then, the shut-off valve 14 is closed, and the shut-off valve 15 is opened to feed the product to a receiver 16. Since the receiver 16 is cooled by cooling water 17, the product is cooled and discharged into a take-off container 18. Reference numeral 19 denotes a compressed gas supplying device which is an auxiliary device provided for coping with the case in which the pressure of the slurry reaction product in the system becomes insufficient when the shut-off valve 14 is closed and the shut-off valve 15 is opened.

Figure 2:
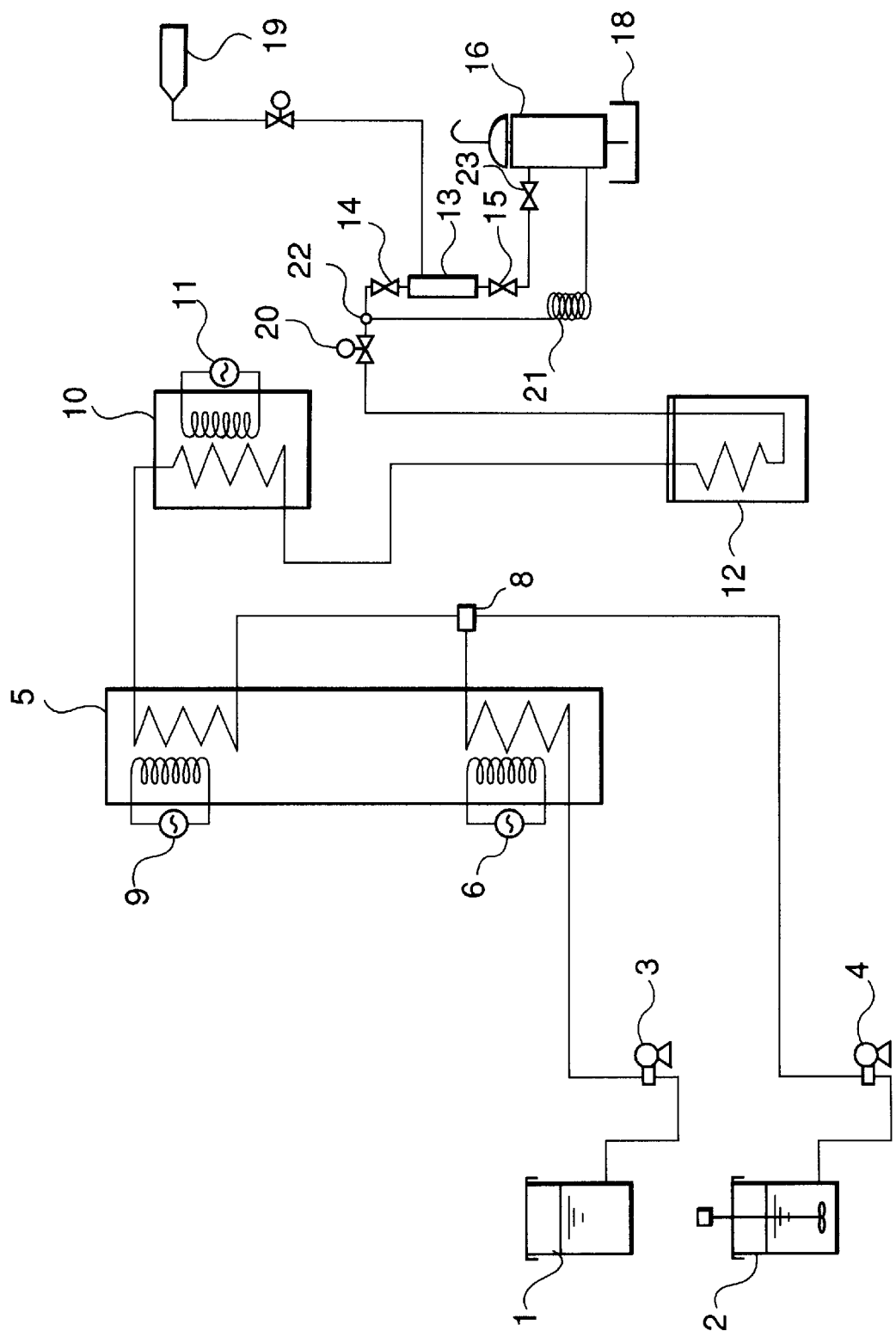
FIG. 2 shows another example of the apparatus for carrying out the present invention.
Figure 3:
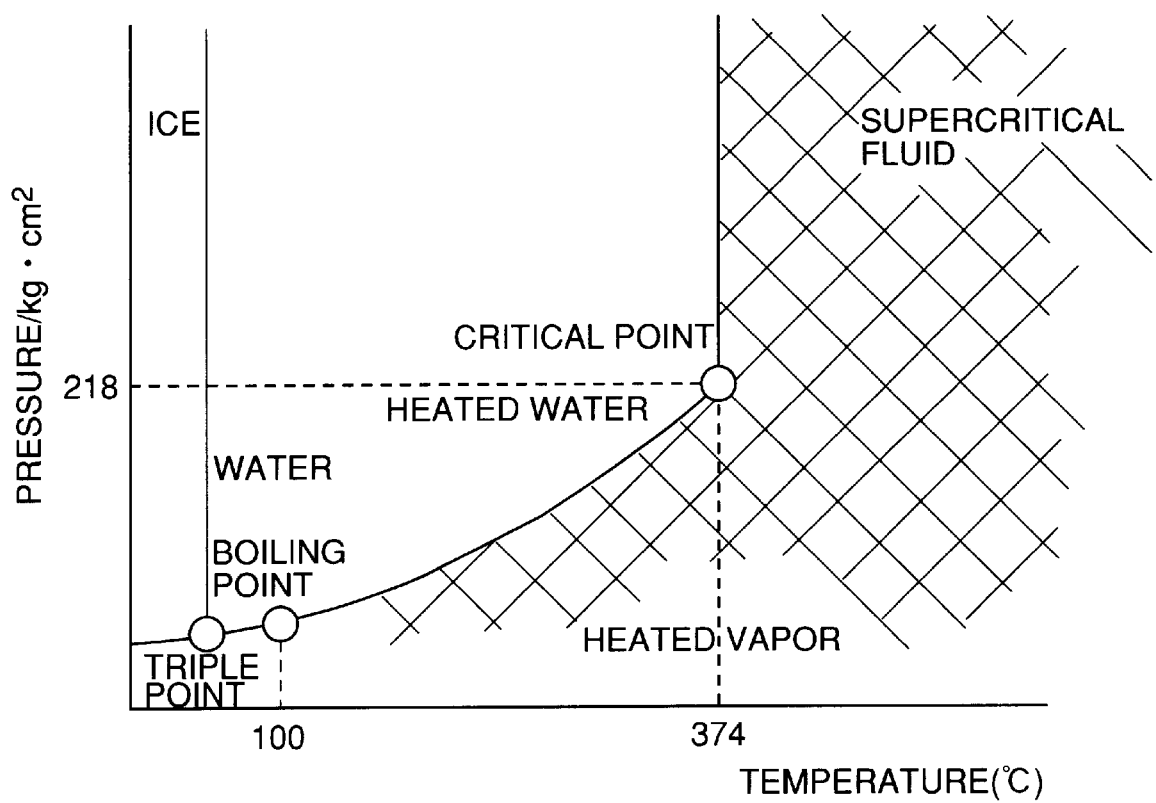
FIG. 3 is a graph showing the relation between a synthesis region of alumina, which is one example of hydrothermal synthesis, and a state-of-water diagram.

FIG. 2 shows another example of the continuous hydrothermal synthesis apparatus according to the present invention. Reference numeral 1 denotes an aqueous liquid tank, reference numeral 2 denotes a slurry tank, and reference numerals 3 and 4 denote a pump for feeding an aqueous liquid and a pump for feeding a slurry, respectively. Reference numeral 5 denotes a heating section, and reference numeral 6 denotes a heater. The aqueous liquid (water) which has been fed from the aqueous liquid tank 1 by the pump 3 is heated to a temperature not lower than the saturated vapor temperature, particularly not lower than the critical temperature, by the heater 6, while the slurry in the slurry tank 2 is fed out by the pump 4 at its normal temperature. The aqueous liquid which have been heated in this manner and the slurry of normal temperature are mixed in the atomizing-mixing section 8, and the mixture is heated up to a temperature close to its reaction temperature by the heater 9 and is fed to the reaction section 10. The reaction section 10 is provided with the heater 11 so that it is maintained at a constant temperature. The reaction product is forcedly cooled by the cooler 12 and is fed to the product discharging section 13 or a thin pipe 21 through a throttle valve 20. The throttle valve 20 may be omitted. The product discharging section 13 or the thin pipe 21 is selected by a cock 22. The shut-off valve 14 is provided before the product discharging section 13, while the shut-off valve 15 and a shut-off valve 23 are provided after the product discharging section 13. If the product discharging section 13 is selected, the following operation is performed: when the shut-off valve 14 is opened, the product is accommodated into the product discharging section 13, and then the shut-off valve 14 is closed and the shut-off valves 15 and 23 are opened to feed the product to the receiver 16. The product is discharged into the take-off container 18. Reference numeral 19 denotes a compressed gas supplying device which is an auxiliary device provided for coping with the case in which the pressure of the slurry reaction product in the system becomes insufficient when the shut-off valve 14 is closed and the shut-off valve 15 is opened. If the thin pipe 21 is selected, the product passes through the thin pipe 21 so that its pressure is reduced to a normal pressure owing to pressure loss in the thin pipe, and the product is fed to the receiver 16 and discharged into the take-off container 18.

In either of the above-described examples, the atomizing-mixing section 8 atomizes the mixture by means of an atomizing device, as required, and then reduces the particle size of the obtained fine particles to not greater than 10 $\mu$m by means of a granulator.

In accordance with the present invention, since hydrothermal synthesis can continuously be performed, the time of processing can be shortened and the number of process steps can be reduced, so that remarkable technical and economical effects can be realized. In a conventional batchwise synthesis method, it is necessary to take account of not only a synthesis time determined by a desired temperature and pressure but also a temperature rising time and a temperature falling time after the setting of a material, so that it takes long time to take out a product after the setting of the material. In contrast, in accordance with the present invention, an aqueous liquid and a slurry are continuously fed from one side and are pressurized and rapidly heated, and are then rapidly cooled by a cooler, so that the time of processing is extremely short. In addition, discharging can always be performed without lowering the pressure in the piping, by either of two methods which can be selected by a cock, i.e., by a method of alternately opening upstream and downstream shut-off valves or by a method which makes use of pressure loss during the passage of a product through a thin pipe. Accordingly, since the time required to retain the material in the piping needs only to be taken into account as a synthesis time, an extremely efficient process is realized.

What is claimed is:

1. A process for making metal oxide powders by hydrothermal synthesis comprising separately preparing a material slurry and an aqueous liquid; pressurizing and heating the material slurry to a temperature lower than the saturated vapor temperature; pressurizing and heating the aqueous liquid in excess of the saturated vapor temperature; separately feeding the material slurry and the aqueous liquid through different pipes into an atomizing-mixing section; atomizing and mixing both the material slurry and the aqueous liquid thereby reducing the particle size of the material slurry and effecting hydrothermal synthesis in a reaction section in excess of the saturated vapor temperature.

2. A process for making metal oxide powders by hydrothermal synthesis, comprising separately preparing a material slurry and an aqueous liquid; pressurizing the material slurry at normal temperature; pressurizing and heating the aqueous liquid in excess of the saturated vapor temperature; separately feeding the material slurry and the aqueous liquid through different pipes into an atomizing-mixing section; atomizing and mixing both the material slurry and the aqueous liquid thereby reducing the particle size of the material slurry, and effecting hydrothermal synthesis in a reaction section in excess of the saturated vapor temperature.

3. A process for making metal oxide powders by hydrothermal synthesis according to claim 1, in which the material slurry and the aqueous liquid, after they are mixed, are heated to a temperature in excess of the saturated vapor temperature.

4. A process for making metal oxide powders by hydrothermal synthesis according to claim 2, in which the material slurry and the aqueous liquid, after they are mixed, are heated to a temperature in excess of the saturated vapor temperature.

5. A process for making metal oxide powders by hydrothermal synthesis according to claim 1, in which the reaction product is cooled more rapidly than by natural cooling after reaction.

6. A process for making metal oxide powders by hydrothermal synthesis according to claim 2, in which the reaction product is cooled more rapidly than by natural cooling after reaction.

7. A process for making metal oxide powders by hydrothermal synthesis according to claim 1, in which the reaction product is taken out of the system while retaining the pressurized state in the system by alternately opening and closing shut-off valves provided above and below a product discharging section.

8. A process for making metal oxide powders by hydrothermal synthesis according to claim 2, in which the reaction product is taken out of the system while retaining the pressurized state in the system by alternately opening and closing shut-off valves provided above and below a product discharging section.

9. A process for making metal oxide powders by hydrothermal synthesis according to claim 1, in which the reaction product is taken out of the system after its pressure is reduced to atmospheric pressure by utilizing a pressure loss due to a fluid resistance of an inner wall of a thin pipe provided in the product discharging section.

10. A process for making metal oxide powders by hydrothermal synthesis according to claim 2, in which the reaction product is taken out of the system after its pressure is reduced to atmospheric pressure by utilizing a pressure loss due to a fluid resistance of an inner wall of a thin pipe provided in the product discharging section.

11. A process for making metal oxide powders by hydrothermal synthesis according to claim 1, in which the reaction product is taken out of the system by changing over between two discharging ways while retaining the pressurized state in the system, one of the discharging ways allowing the product to be taken out by alternately opening and closing shut-off valves provided above and below a product discharging section and the other discharging way allowing the product to be taken out of the system after the pressure applied to the product is reduced to atmospheric pressure by utilizing a pressure loss due to a fluid resistance of an inner wall of a thin pipe provided in the product discharging section.

12. A process for making metal oxide powders by hydrothermal synthesis according to claim 2, in which the reaction product is taken out of the system by changing over between two discharging ways while retaining the pressurized state in the system, one of the discharging ways allowing the product to be taken out by alternately opening and closing shut-off valves provided above and below a product discharging section and the other discharging way allowing the product to be taken out of the system after the pressure applied to the product is reduced to atmospheric pressure by utilizing a pressure loss due to a fluid resistance of an inner wall of a thin pipe provided in the product discharging section.

13. A process for making metal oxide powders by hydrothermal synthesis comprising: separately preparing a material slurry and an aqueous liquid; pressurizing and heating the material slurry to a temperature lower than the saturated vapor temperature or pressurizing the material slurry at normal temperature; pressurizing and heating the aqueous liquid in excess of the saturated vapor temperature; separately feeding the material slurry and the aqueous liquid through different pipes into an atomizing-mixing section; atomizing and mixing the material slurry and the aqueous liquid, thereby reducing the particle size of the material slurry; feeding the resultant mixture into a reaction section to effect hydrothermal synthesis therein at a temperature in excess of the saturated vapor temperature to form a reaction product; and transporting the reaction product through a pipe to a discharging section.

14. A process for making metal oxide powders by hydrothermal synthesis according to claim 13, in which the material slurry and the aqueous liquid, after they are mixed, are heated to a temperature in excess of the saturated vapor temperature.

15. A process for making metal oxide powders by hydrothermal synthesis according to claim 13, in which the reaction product is cooled more rapidly than by natural cooling after reaction.

16. A process for making metal oxide powders by hydrothermal synthesis according to claim 13, in which the reaction product is taken out of the system while retaining the pressurized state in the system by alternately opening and closing shut-off valves provided above and below a product discharging section.

17. A process for making metal oxide powders by hydrothermal synthesis according to claim 13, in which the reaction product is taken out of the system after its pressure is reduced to atmospheric pressure by utilizing a pressure loss due to a fluid resistance of an inner wall of a thin pipe provided in the product discharging section.

18. A process for making metal oxide powders by hydrothermal synthesis according to claim 13, in which the reaction product is taken out of the system by changing over between two discharging ways while retaining a pressurized state in the system, one of the discharging ways allowing the product to be taken out by alternately opening and closing shut-off valves provided above and below a product discharging section and the other discharging way allowing the product to be taken out of the system after the pressure applied to the product is reduced to atmospheric pressure by utilizing a pressure loss due to a fluid resistance of an inner wall of a thin pipe provided in the product discharging section.

* * * * *